A. S. DENNIS.
TRANSFER MECHANISM FOR CALCULATING MACHINES.
APPLICATION FILED FEB. 15, 1918.

1,364,618.

Patented Jan. 4, 1921.
8 SHEETS—SHEET 1.

INVENTOR
Adolphus S. Dennis
by William A. Stock
ATTY

A. S. DENNIS.
TRANSFER MECHANISM FOR CALCULATING MACHINES.
APPLICATION FILED FEB. 15, 1918.
1,364,618.
Patented Jan. 4, 1921.
8 SHEETS—SHEET 3.
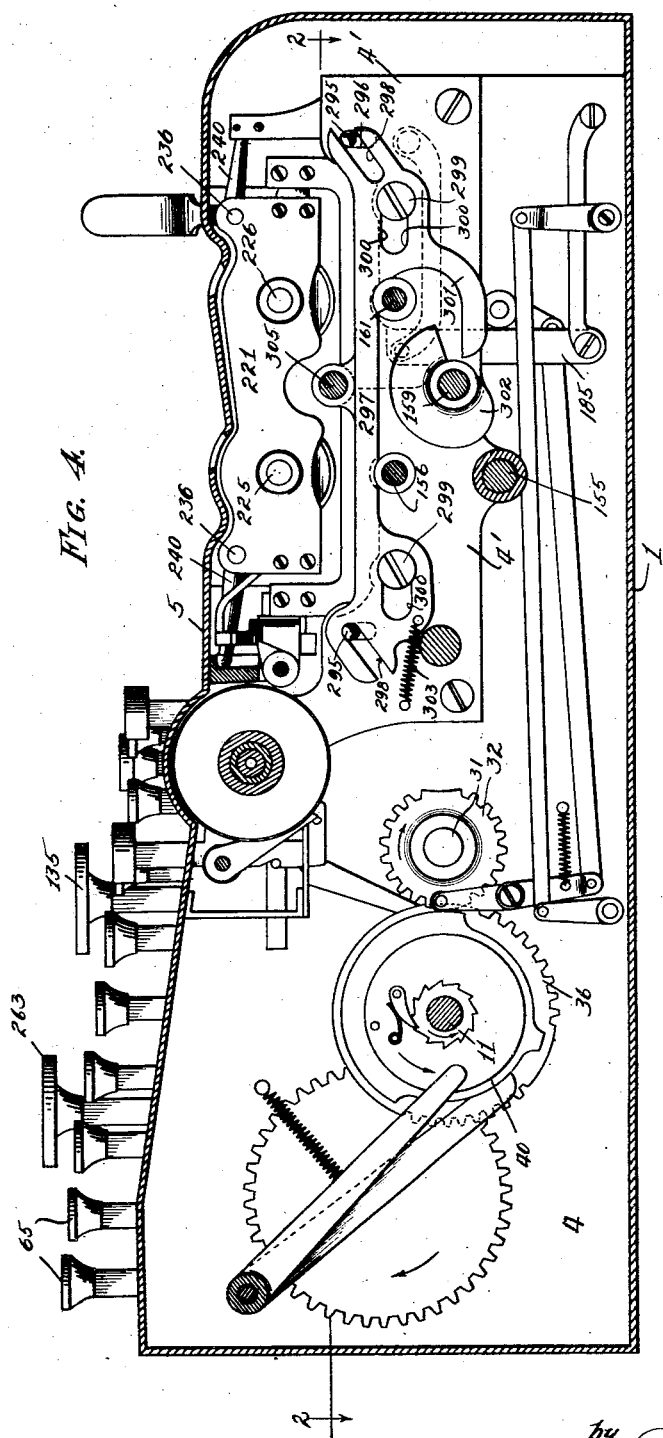
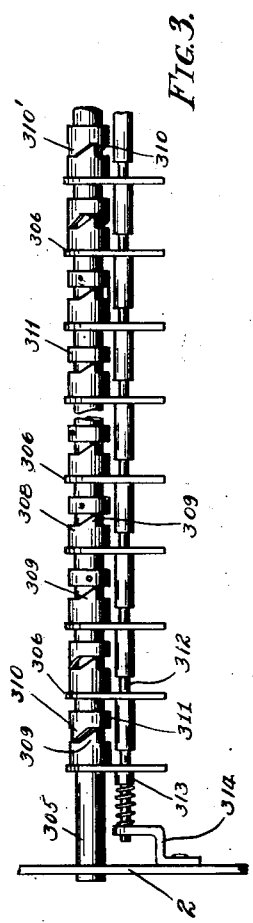
INVENTOR
Adolphus S. Dennis
by William A. Stock
ATTY

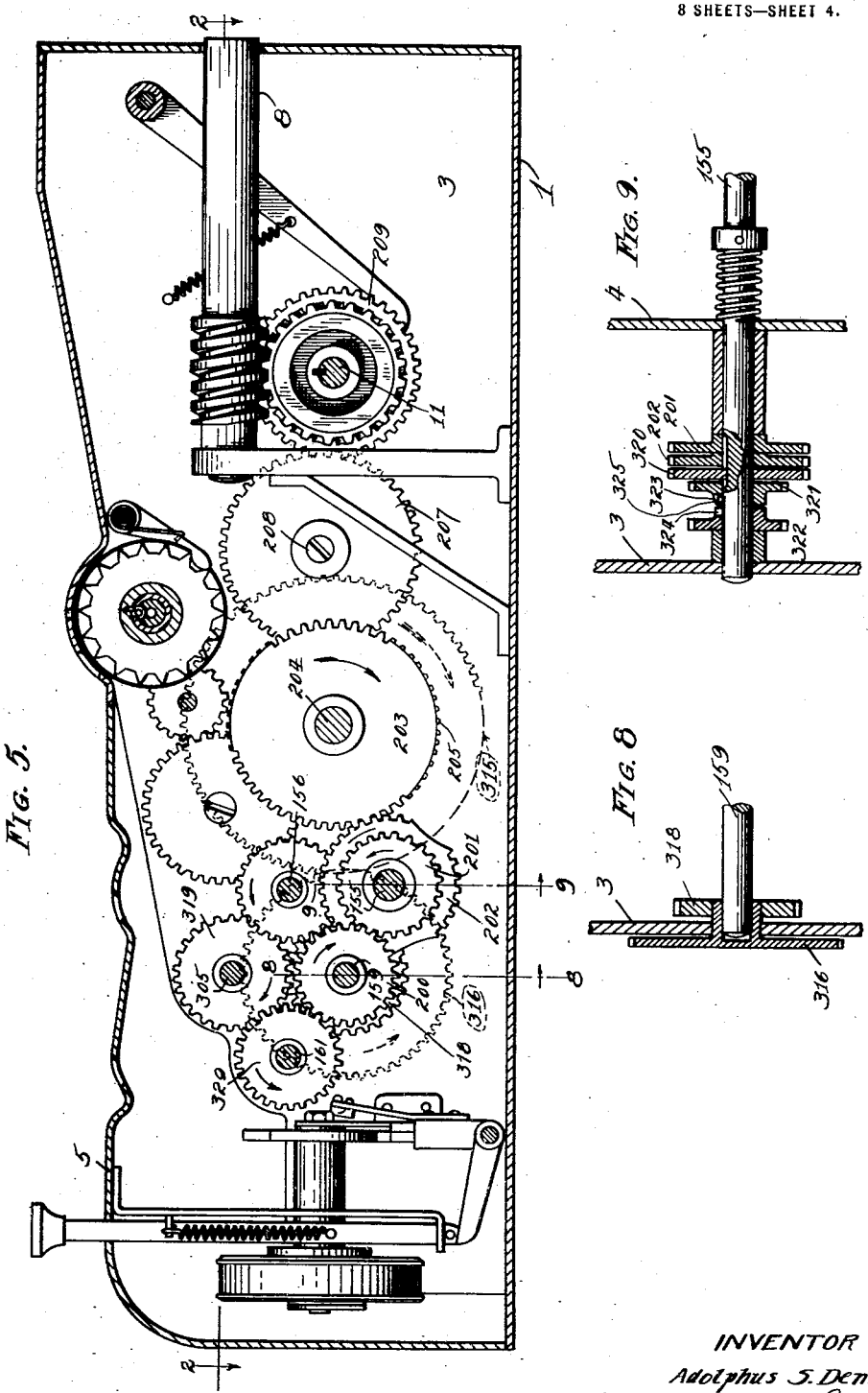

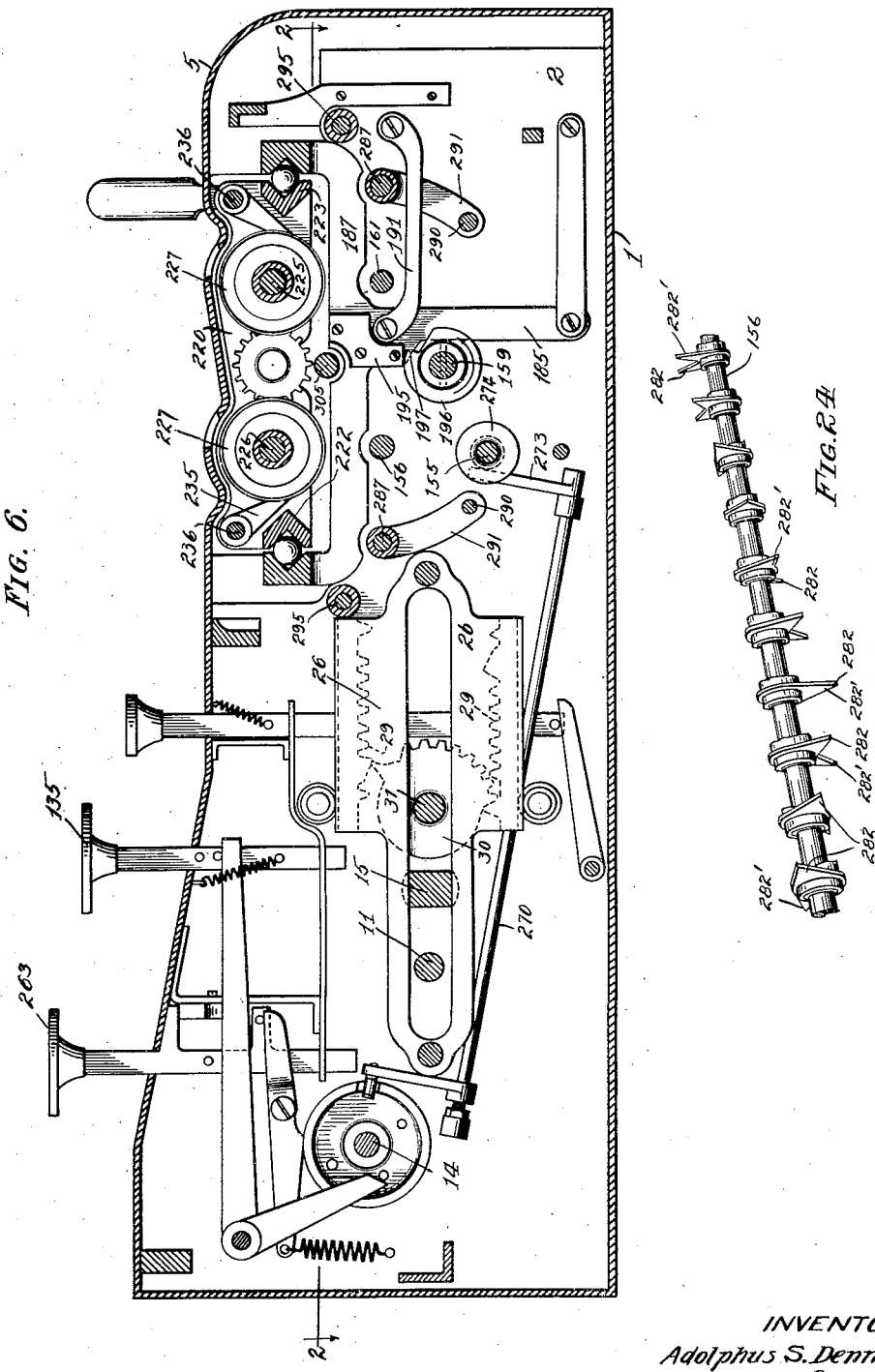

A. S. DENNIS.
TRANSFER MECHANISM FOR CALCULATING MACHINES.
APPLICATION FILED FEB. 15, 1918.
1,364,618.
Patented Jan. 4, 1921.
8 SHEETS—SHEET 6.
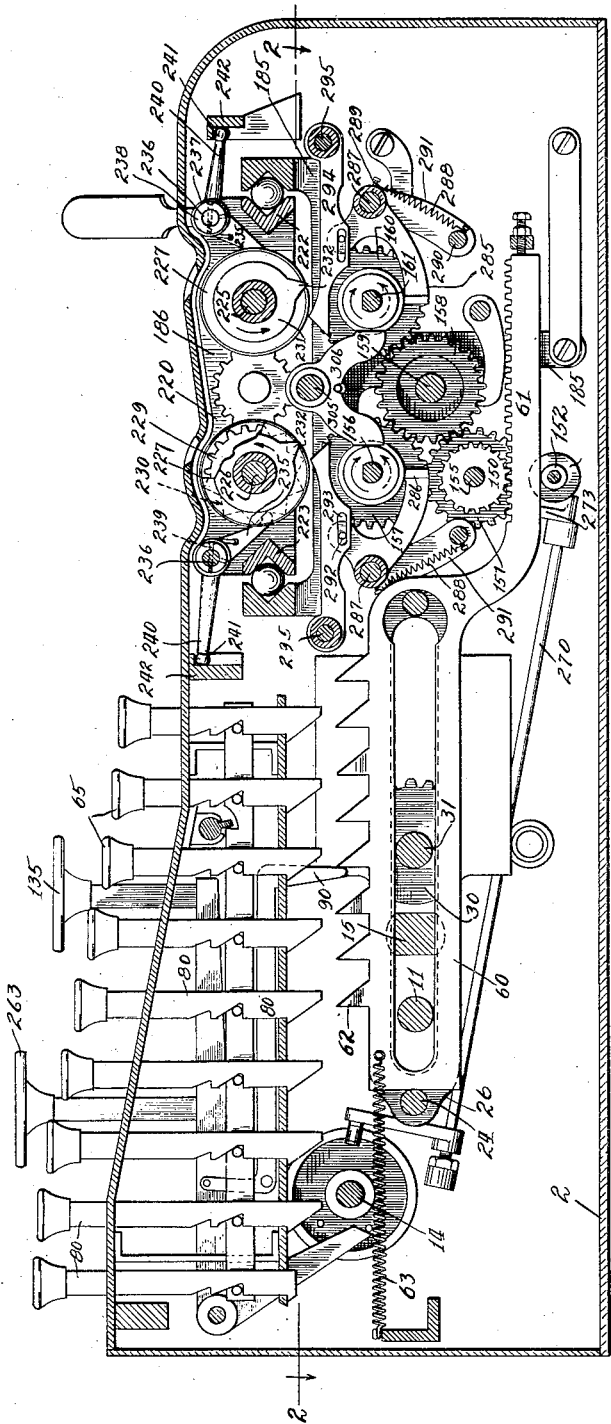
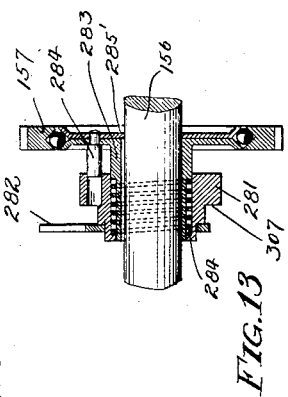
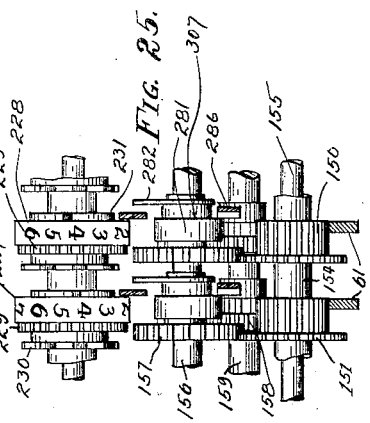
INVENTOR
Adolphus S. Dennis
by William A. Stock
ATTY.

A. S. DENNIS.
TRANSFER MECHANISM FOR CALCULATING MACHINES.
APPLICATION FILED FEB. 15, 1918.

1,364,618.

Patented Jan. 4, 1921.
8 SHEETS—SHEET 7.

INVENTOR
Adolphus S. Dennis
by William A. Stock
ATTY.

A. S. DENNIS.
TRANSFER MECHANISM FOR CALCULATING MACHINES.
APPLICATION FILED FEB. 15, 1918.
1,364,618.
Patented Jan. 4, 1921.
8 SHEETS—SHEET 8.
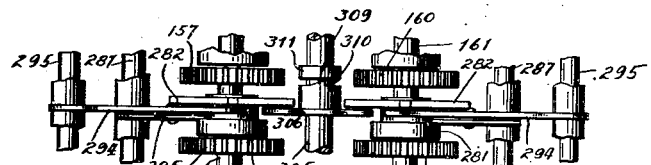
Fig. 14.
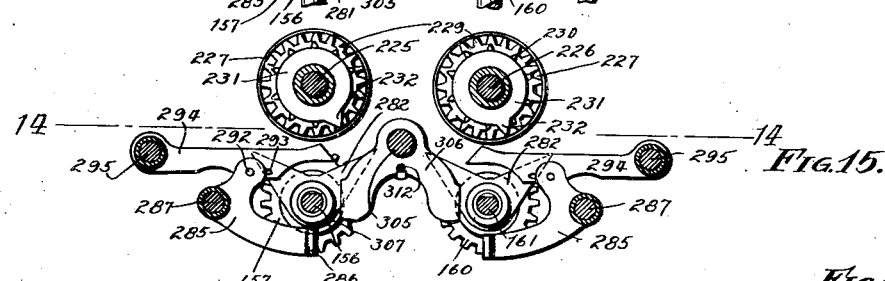
Fig. 15.
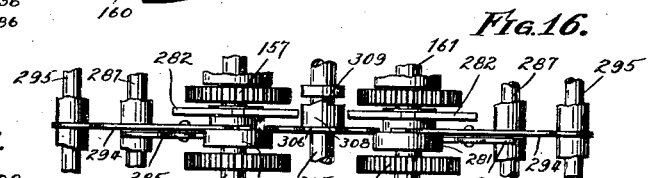
Fig. 16.
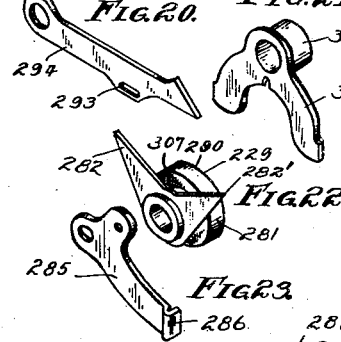
Fig. 20.
Fig. 21.
Fig. 22.
Fig. 23.
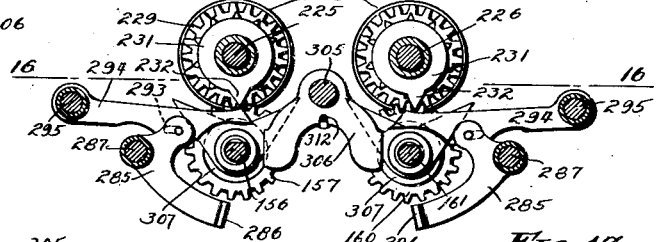
Fig. 17.
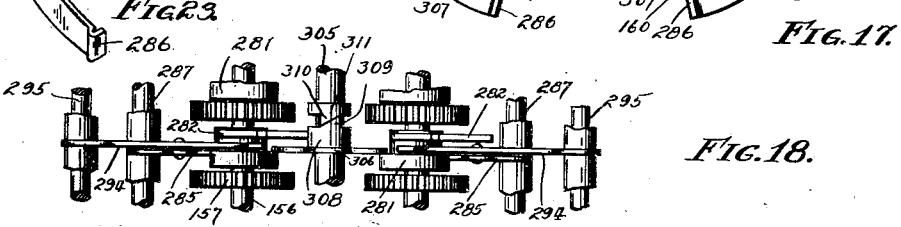
Fig. 18.
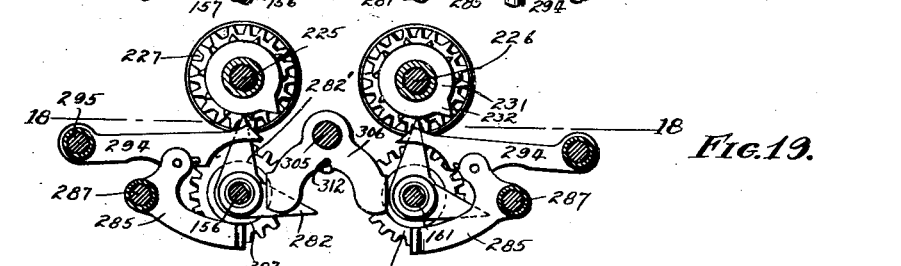
Fig. 19.
INVENTOR
Adolphus S. Dennis
by William A. Stock
ATTY.

UNITED STATES PATENT OFFICE.

ADOLPHUS S. DENNIS, OF SAN FRANCISCO, CALIFORNIA, ASSIGNOR TO MARCHANT CALCULATING MACHINE COMPANY, A CORPORATION OF CALIFORNIA.

TRANSFER MECHANISM FOR CALCULATING-MACHINES.

1,364,618. Specification of Letters Patent. Patented Jan. 4, 1921.

Original application filed September 18, 1915, Serial No. 51,302. Divided and this application filed February 15, 1918. Serial No. 217,371.

*To all whom it may concern:*

Be it known that ADOLPHUS S. DENNIS, a citizen of the United States, residing at San Francisco, in the county of San Francisco and State of California, has invented certain new and useful Improvements in Transfer Mechanism for Calculating-Machines, of which the following is a specification.

My invention relates to improvements in calculating machines and has particular reference to the transfer mechanism to be used in connection with the apparatus disclosed in my prior U. S. Patent No. 949,979 and in my co-pending applications Serial No. 59,238 filed May 31, 1916 and Serial No. 51,302, filed September 18, 1915, of which latter application, the present application is a division.

The calculating machine herein described, is of the type adapted for performing the operations of addition, subtraction, multiplication, and division, the operation of subtraction being performed by reversing the direction of rotation of the numeral wheels, in contradistinction to those machines which perform subtraction by the addition of the co-digit of the subtrahend. It will be understood that while throughout the specification I have referred only to addition and subtraction, this is for the reason that division and multiplication may be considered as but continuous application of subtraction and addition respectively.

The principal object of the present invention is to provide improved means for carrying the "tens" or in other words to allow each indicating wheel to be rotated one digit upon the complete rotation of the wheel adjacent to it of the next lower order.

Another object of the present invention is to so arrange this carrying mechanism that it will operate equally well either for addition or subtraction.

With these and other objects in view the invention consists of certain novel features of construction, combinations and arrangements of parts hereinafter described and more specifically pointed out in the appended claims; it being understood that changes in form, proportion, size and minor details of construction within the scope of the claims may be resorted to without departing from the spirit of the invention or sacrificing any of the advantages thereof.

Reference being had to the drawings forming a part of the specification:

Fig. 3 is a view in elevation of a certain portion of the tens carrying mechanism as viewed from the back of the machine.

Fig. 4 is a view on the line 4—4 of Fig. 2 looking in the direction of the arrow.

Fig. 5 is a view taken on the line 4—4 of Fig. 2 but looking in the opposite direction of the arrow.

Fig. 6 is a view through the right hand end of the machine on the line 6—6 of Fig. 2.

Fig. 7 is a view on the line 7—7 Fig. 2.

Fig. 8 is a detail view in section on the line 8—8 Fig. 5.

Fig. 9 is a similar view on the line 9—9 of Fig. 5.

Figure 1:
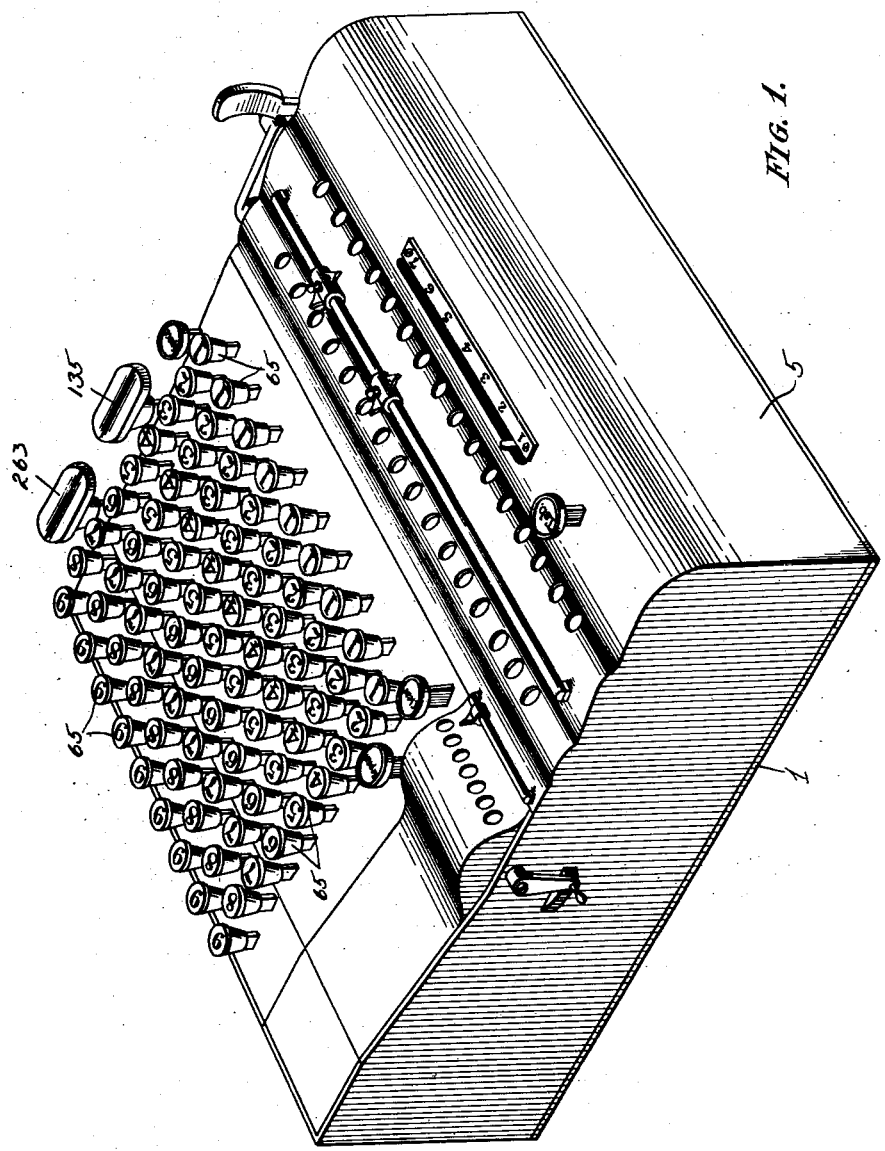
Figure 1 is a view in perspective showing the outside of the machine.
Figure 2:
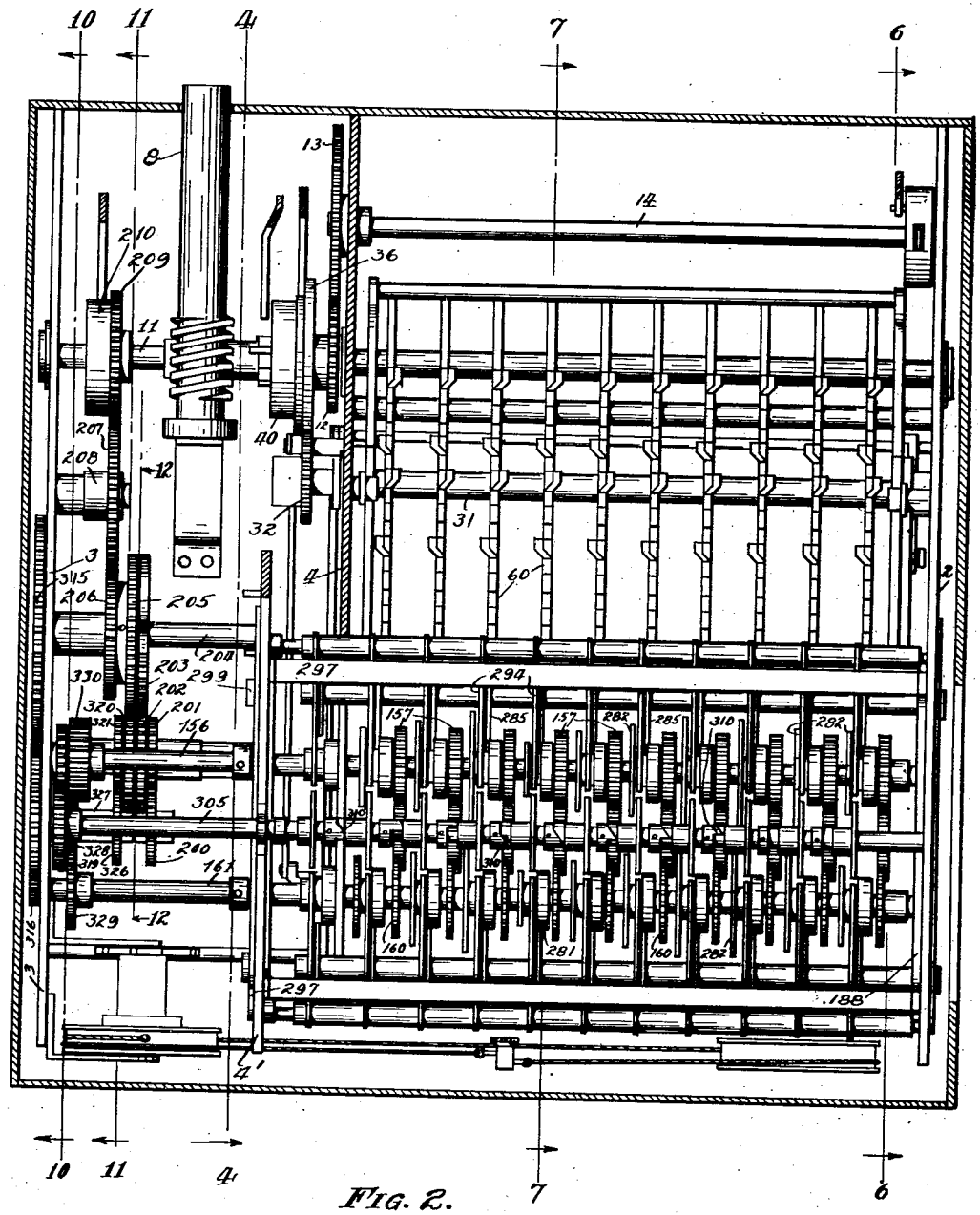
Fig. 2 is a view in section on the lines 2—2 of Figs. 4, 5, 6, and 7.
Figure 10:
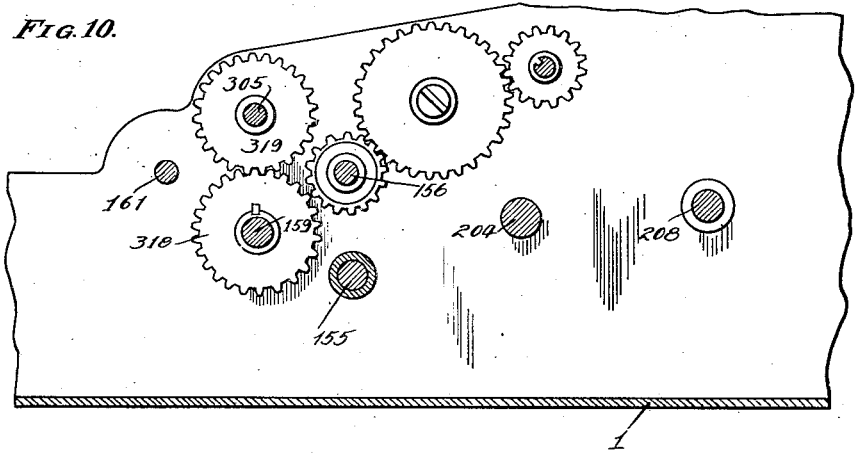
Figure 11:
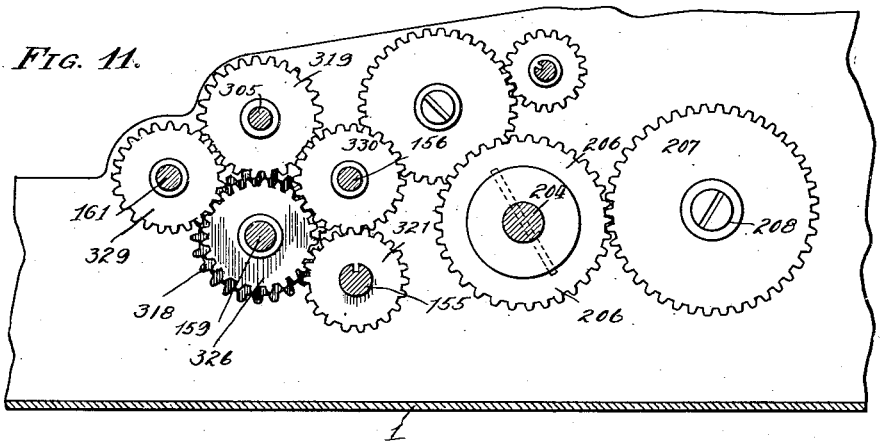
Figure 12:
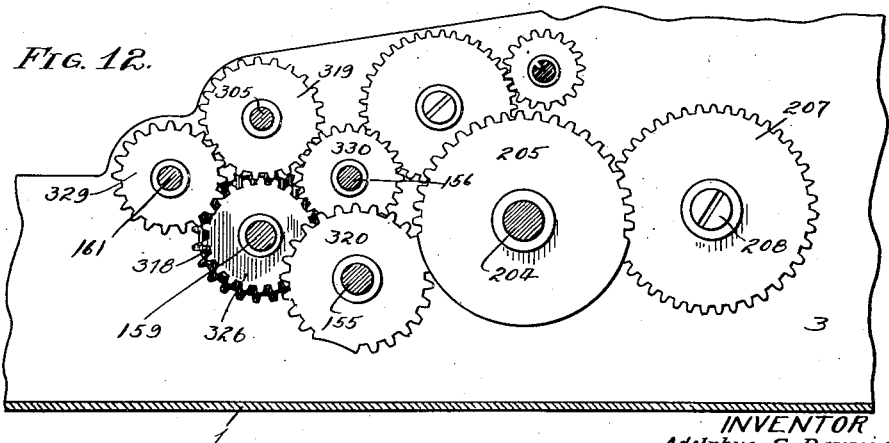

Figs. 10, 11, and 12 are fragmentary sectional views taken on the correspondingly numbered lines of Fig. 2.

Fig. 13 is a detail sectional view of one of the carriers used with the transfer mechanism.

Figs. 14 to 23 inclusive are details of the "ten-carrying" mechanism.

Fig. 24 is a view in perspective showing the manner of arranging the carriers on their supporting shaft, the other mechanism mounted on the same shaft not being shown, the view being taken as looking toward the right.

Fig. 25 is a detail view in elevation of several of the numeral wheels and the associated transfer mechanism looking toward the front of the machine.

Throughout the description it will be assumed, unless otherwise specified that the machine is viewed from the front, and reference will be made to corresponding parts in the several views by like numerals. The base 1 of the machine comprises a plate from the lateral edges of which rise the right and left hand plates 2 and 3 respectively, and an intermediate plate 4. A casing denoted generally by 5, incloses the various operating mechanism and its lower edges are fastened to the edges of base 1.

The main driving shaft is designated by 8 and this shaft is constantly driven by a motor or other suitable means (not shown). Shaft 8 through a worm and wheel or other means drives shaft 11, which in turn through the toothed gears 12 and 13 drives shaft 14. Thus during the time the machine is in use the shafts 8, 11 and 14 are continually rotating.

Supported rigidly by and between the right hand end plate and the intermediate plate 4, is beam 15 on which is reciprocably mounted a rack restoring frame, denoted generally by 26. This frame is driven in a forward and rearward direction by the intermittent gear 30 on shaft 31 which gear meshes with the rack teeth 29 on the frame 26. Shaft 31 is in turn intermittently driven through the coöperating mutilated gears 32 and 36, on shaft 31 and casing of the main clutch 40 respectively. This clutch it may be stated at this point is so arranged that upon being released it makes one revolution with the shaft 11 and then stops in the same relative position which it occupied at the start. As this clutch forms no part of the present invention it is not deemed necessary to describe the same in detail in this application.

Slidably mounted on the beam 15 are certain rack bars 60, from the forward end of which project downward and then forward toothed racks 61. Likewise projecting upward from the upper edge of each of these rack bars are a series of staggered lugs 62 which coöperate with the stems 80 of the numeral keys 65. It will be understood that these numeral keys are located above and in the same plane as the rack bars 60 and that when one of these numeral keys is depressed the lower end thereof engages the corresponding lug on the rack bar and so limits the movement of the latter to an amount corresponding to the order of the numeral key depressed.

Clutch 40 is thrown into action by means of a key 135 and which is designated the "adding key." Thus when this key is depressed the clutch is released and the casing thereof rotates in the direction of the arrow in Fig. 4, which movement during the first half revolution of the clutch first rotates shaft 31 through a half revolution then allows a short interval of rest then moves the shaft through the remaining half revolution and permits it to remain idle during the remaining half revolution of the casing.

Shaft 31 through the mutilated gear 30 first moves the rack frame rearwardly and then after a slight pause moves it forwardly. It will be understood that during the rearward movement of the rack frame that the rack bars 60 are pulled rearwardly by springs 63 until the lower end of any numeral key which may be depressed arrests such movement. A forward movement of these rack bars is effected by the tie rod 24 which engages their rear end. This movement as will be explained later on, causes the rotation of the adding wheels and to prevent operation of those rack bars which are not controlled by the depressed numeral key I provide a stop 90 which normally prevents any rearward movement thereof. This stop when any numeral key of a given bank is depressed is raised.

Meshing with the rack 61 of each of the rack bars is a pinion 150 which has secured to it a gear 151. The rack 61 is held in constant mesh with the pinion 150 by a roller 152 upon which the lower edge rests. Pinion 150 is substantially twice the width of gear 151 and shaft 155 whereon the pinion 150 and the gears 151 are revolubly mounted is shiftable and is journaled in the end frames of the machine. Collars 154 separate the respective units comprising pinions 150 and 151 and prevent longitudinal movement upon the shaft 155 with respect to each other.

It may be briefly stated at this time that the mechanism for effecting the shifting of shaft 155 and the gears revolubly mounted thereon, is controlled by the subtraction key 263 and when this key is depressed, the first operation of the machine causes the shaft 270 to be rocked and later to start the main clutch 40 heretofore described. The rocking of shaft 270 through the arm 273 keyed on the end thereof coöperate with the disk 274 secured on the shaft 155 and shifts the latter with its respective pinions.

Revolubly mounted upon a shaft 156 which is also journaled within the end plates of the machine are the gears 157 which are considerably wider than the gears 151. The gears 157 constantly mesh with gears 158 which are revolubly mounted upon the shaft 159. The respective gears 157 are not in the same vertical plane as the corresponding gears 158 but they overlap so that the edges of the teeth of the gears 157 mesh with the edges of the teeth of the gear 158. The gears 158 also constantly mesh with gears 160 that are revolubly mounted upon a shaft 161 supported like shaft 156 in the end plates 2 and 3. For addition the drive is from gear 151 to gear 157, from it to gear 158 and then to gear 160. Now when gears 151 are shifted, the drive is from the latter to gear 158 and from it to gears 157 and 160, and thus the latter gears will be driven in a reverse direction to that which they are driven when gears 151 and 157 were in direct mesh.

From this it becomes apparent that in the operation of subtraction a numeral that will constitute the minuend is placed within the machine by depressing the appropriate numeral keys and then operating key 135. The key bank is then cleared and a numeral corresponding to the subtrahend is placed in the machine by depressing the numeral keys corresponding to the same and then the key 263 is operated. This results in the shifting of the shaft 155 and the pinions 150 guided thereby and a subsequent operation of the machine will rotate the numeral wheels 227 in the reverse direction to that indicated by the arrow appearing on the wheels in Fig. 7 thereby returning them toward their original position a distance corresponding to the subtrahend and the result which appears upon the reading line of the indicating wheels is the remainder.

Supported within the front of the machine above the wheels 157 and 160 is a carriage 186. This carriage is slidably mounted in the frame 185 which is dropped during the return movement of the rack bars whereby the numeral wheels are engaged with gears 157 and 160 and during this period actuated. The mechanism by which this movement of the frame is effected consists of the intermittently driven cams 196 keyed to shaft 159 which coöperates with bearing plates 195 on each end of frame 185. Each of the cams have an offset 197 which permits the bearing plate, consequently the frame and carriage 186, to drop shortly after the cams 196 have started to rotate. The dropping of this carriage takes place during the pause which the rack frame makes before it reverses and thus as the toothed gears 229 of the indicating wheels mesh with the gears 157 and 160 and when the rack bars move forward they are rotated. The frame is again lifted as soon as the rack frame has reached its normal forward position.

Between the intermediate plate 4' and the left hand end plate 3 of the machine, the shaft 159 has secured to it a gear 200 which meshes with a gear 201 of like size that is revolubly mounted on shaft 155. Gear 201 rotates with a mutilated gear 202 which co-acts with a larger mutilated gear 203, that is secured to shaft 204. The latter gear is held in fixed relation with gears 205 and 206 (see Figs. 2, 11 and 12). Gear 206 is pinned to shaft 204 and is driven through an intermediate gear 207 that is carried upon a stud 208, from a gear 209 on the clutch 210.

Clutch 210 is of such construction that when it is thrown into engagement, its casing and consequently the gear 209, makes one complete revolution. This clutch is operated through appropriate mechanism by the main clutch 40, as shown in my pending application Serial No. 51,302, and at the time when the latter has made substantially a quarter revolution. At this time the rack bars have been moved toward the rear of the machine and during the interval that they pause, clutch 210 will have rotated shaft 159, through the train of gears just described, a sufficient amount to cause cams 196 to drop the frame 185.

It may be stated, at this time, that for an interval of time the shaft 159 remains stationary while the longer smooth portion of the cam 203 is traveling over the appropriate smooth spot of the gear 202. It will also be stated at this time, that the dropping of the frame 185 causes the gears of the indicating wheels to mesh with the gears 157 and 160, and they remain in mesh until the rack bars 60 have been brought to normal position by the restoring frame. Immediately after the rack bars have reached their forward position the shaft 159 again starts rotation and lifts the frame 185.

Having thus described the general mechanism of the machine I will next describe the "tens-carrying" mechanism which constitutes the particular subject of the present invention. It will be understood that the object of the "tens-carrying" mechanism is to allow each indicating wheel to rotate one digit upon the complete rotation of the wheel adjacent to it of the next lower order. Thus in addition when any one wheel passes from 9 to zero or something thereabove the wheel to the left will be advanced one digit.

Reference should be had particularly to Figs. 7 and 13 to 23 wherein Figs. 15, 17 and 19 are taken as looking toward the left hand end of the machine.

The indicating wheels just mentioned are supported in the carriage 186, which comprises a pair of end plates 220 and 221 which are connected by rails 222 and 223, which coöperate with corresponding rails of the frame 185, to reciprocably support the carriage. Journaled within the end frames 220 and 221 of the carriage, are the front and rear shafts 225 and 226 respectively. Supported upon each of these shafts are the indicating wheels referred to generally by the numeral 227, and each of which comprises a smooth portion 228, which bears a series of digits that are arranged in successive order from zero to nine about the periphery of said smooth portion. To one side of the indicating portion 228, the wheel is provided with a gear 229 and adjacent the gear 229 is a star wheel 230. On the opposite side of the indicating portion 228, each of the wheels is provided with a disk 231, having a pointed finger 232 radiating therefrom. (See Figs. 7, 15, 17, 19 and 25).

The indicating wheels 227 are capable of rotation upon the shafts 225 and 226, and to prevent their being accidentally turned or disarranged while the carriage is elevated and the respective gears 229 of the indicating wheels are therefore out of mesh with the gears 157 and 160, I provide detent pawls 235, for coöperation with the star wheels 230. These pawls are carried upon the shafts 236 which are journaled in the end plates of the carriage. The pawls are mounted loosely upon the shaft 236, and the springs 237 have their opposite ends connected, one to the adjacent collar 238, and the other to the pawl. The collars are fastened to the shaft, by the screws 239 and thus the springs press their pawls toward their respective star wheels. An arm 240 projects from each of the shafts 236, and carries a friction roller 241 upon its outer end, and this roller is arranged to traverse the rails 242 that are supported from a stationary part of the machine. It will be seen from the foregoing that, when the carriage is dropped, the arms 240 oscillate the shafts causing them to materially reduce the tension of the springs 237 thereby permitting the wheels 227 to be turned freely by the wheels 157 and 160.

Slidably mounted upon the shafts 156 and 161 between their respective adjacent gears 157 and 160 are elements which will be referred to hereinafter as the carriers, and indicated generally at 380. As shown in the perspective in Fig. 22, each of the carriers comprises a hub section 281 from one end of which laterally extend the points 282 and it will be understood that the angle between these points varies (as shown in Fig. 24). This hub portion is slidably mounted upon the sleeve 283 and interposed in an annular recess between the two parts is a spring 284 which tends to slide the carriers to the left, or into the plane of the star wheel of the indicator that is directly above it and thus move the latter one point. Ordinarily the carriers are retained in normal position, with their points 282 out of the plane of the star wheels above, by means of the bell crank levers 285, the lower ends of which are turned laterally, as shown at 286 (Fig. 23) and bear upon the end of the hub portions of the carriers. The bell crank levers 285 are journaled upon the shafts 287 which are supported in the end frame 2 and the intermediate plate 4' and are rocked by springs 288 (Fig. 7) in a direction to elevate their free ends 286.

These springs have their upper ends connected to the hubs of the bell crank levers, at 289 and their lower ends anchored to rods 290 which are conveniently supported by links 291 from the shafts 287. The upper arms of the bell crank levers have pins 292 which project laterally therefrom into slots 293 of the arms 294 which are mounted upon the shafts 295. The ends of the shafts 295 project through the slots 296 in the right hand end plate and the intermediate plate 4', and beyond each of said plates there is located means for moving the shafts 295 vertically within the slots 296. This means consists of a plate 297 which has inclined slots 298 for the reception of the ends of the shaft 295. The two plates 297 are identical, and in Fig. 4, one of these plates is clearly shown as supported from the intermediate plate 4' upon the screws 299 which project through the slots 300 that are formed in said plate. A portion 301 of each of the plates 297 extends downwardly and rearwardly from the front portion of the plate, toward the shaft 159; and a cam 302, that is secured to the shaft adjacent each of the extensions 301, coöperates with said extension to move the plate forwardly and thus through the inclined slots 298, lower the shafts 295. Springs 303 are employed for restoring the plates 297 to normal position.

Returning now to the arms 294 it will be stated that these arms are located in the vertical plane of the disks 231 and their free ends are arranged to be depressed by the points 232 of these disks in the "ten-carrying" operation.

Slidably mounted upon a shaft 305 are shifting forks 306 which project down alongside the hub portions of the carriers and are adapted to engage the shoulders 307 that are formed between the larger and the smaller sections of the hub portions. The hubs 308 of the shifting forks have projections 309 that extend longitudinally therefrom, one face whereof is inclined as shown in the plan view in Figs. 3, 14, 16 and 18. Arranged to coöperate with the projections 309 of the shifting forks, is one or more like projection 310 which extends from the side of the collars 311 that are pinned to the shaft 305. Thus upon each rotation of the shaft 305, the projection 310 rides over the projection 309 and slides the forks 306 upon the shaft. The shifting forks 306 tend to be moved toward the collar 311 by a spring pressed rod 312 which is grooved for coöperation with the underneath edge of the central portions of the forks and is spring pressed toward the left by means of a spring which surrounds the right hand end of the shaft and is interposed between a collar 313, and the adjacent portion of the end plate of the machine through which the rod passes (see Fig. 3).

It will be noted (Figs. 2 and 3) that the points 309 are arranged in a straight line along shaft 305 while the points 310 are arranged in a spiral about the shaft. Thus beginning at the right as viewed in Fig. 2 each point 310 is a greater distance apart from its coöperating point 309, which causes the forks 306 to be successively shifted starting from the right and working toward the left. It will be noted that the collars adjacent the left side of the machine have two points 310 whereby the forks moved thereby are twice actuated for the reason hereinafter explained. It will be understood that one of the sets of points of the carriers is used when the machine is adding, and the other when subtracting, for the reason that the indicating wheels are turned in the reverse direction when subtracting than when adding.

It will be seen from Fig. 24 that the points of the carriers are arranged progressively about the shaft whereon the carriers are mounted, throughout the successive carriers, the angular distance between adjacent points of the successive carriers being great enough to allow time for operation of the carriers of the lowest order before the next higher is thrown into action. This may be expressed also by saying that the various points are arranged spirally about the shaft. It is obvious that the direction of the spiral described by the points that are used in adding will be of the opposite inclination to that defined by the points which are used in subtracting. It follows from this that in some cases only one point will appear upon the carrier and also that after the carrier having the single point is passed, the points to the left, again spread apart as shown in Fig. 24 and present the same relative relation as those to the right, of the single point carrier.

It will now be understood that the function of the second point 310 is to prevent carrying when first point 282 of the carriers pass the star wheel above. It will be noted also that the second point on the collars 311 Fig. 3 which I will designate by 310' is shorter than the second and hence the first move of the fork will not be sufficient to cause the shoulder 307 to drop back of corresponding bell crank 285. It will also be noted that point 310' is flattened on its end which gives time for the carrier point 282 to pass its corresponding star wheel before the carrier is moved back.

Referring now to the details of carrier 290 this consists of the sleeve portion 283 and the hub 281 on which is attached the carrier points 282. Sleeve 283 carries on one end a disk which in coöperation with a similar disk form a hub for the gears 157 or 160 as the case may be. A pin 284' extending into the hub 281 holds there two parts in fixed circumferential relation. The outer disk of the wheel hub is provided with a flat segment 285' which causes the sleeve and consequently the hub 281 to rotate with shaft 156 or 161.

With reference to Fig. 5 and Figs. 11 and 12, I have described how the shaft 159 is rotated from the gear 209, that is carried by the clutch 210. It will be recalled, also, that the gear 206 is pinned to the shaft 204. The shaft 204 projects through the left hand end plate 3 of the machine and beyond said plate has secured to it the mutilated gear 315 which may be seen in full lines in Fig. 2 and in dotted lines in Fig. 5. This gear meshes with a gear 316, the sleeved hub of which is mounted upon the end of the shaft and projects through the end plate 3 where it is provided with a gear 318 which meshes with the gear 319 that is fastened upon the end of the shaft 305, (see Fig. 10). Thus it will be seen how the shaft 305, which carries the shifting forks and the collars 311 which operate said fork, is rotated.

In the case of addition, the shafts 156 and 161, which drive the carriers 380, Fig. 22, are turned to the left, as viewed in Figs. 5 and 14 to 19, through the following gearing. The gear 205, previously described as being located between the gears 203 and 206, drives a mutilated gear 320, that is splined to the shiftable shaft 155, as shown in Fig. 9. Mounted loosely upon the shaft 155, between gear 320 and the left hand end plate 3 of the machine, are two gears 321 and 322. It will be seen that each of these gears is provided with a hub, the opposed faces of which have notches, that of the gear 321 being shown at 323, and the notch of the gear 322 being shown at 324. A pin 325 projects laterally from the shaft 155 and is adapted to occupy either one or the other of the notches, according to the position of the shaft. Now, under conditions when the machine is intended to add, the pin 325 occupies the notch 323 of gear 321, causing said gear to be rotated with the shaft 155, which, it will be recalled, is driven through the gear 320. The gear 321 drives a gear 326, which is rigid with the sleeve 327 loosely mounted upon the shaft 159. Secured to the opposite end of this sleeve 327, is a gear 328 which meshes with both the gear 329 that is fastened to the shaft 161, and a gear 330 that is secured to the shaft 156. It will be seen from this that, under the conditions described, the gears 329 and 330 and consequently the shafts 156 and 161 will be driven in the direction indicated by the arrows in Fig. 5. Attention is now directed to the fact that the gear 330 is considerably wider than the gear 328, and it will be observed from Fig. 2, that the gear 328 meshes with that side of the gear 330 toward the left hand end of the machine. The other zone of the gear 330 is in mesh with the previously mentioned gear 322.

In case of subtraction, the shaft 155 is shifted to transfer the pin 325 from the notch of the gear 321 to that of the gear 322. In the subsequent operation of the machine gear 322 will be rotated with the shaft 155 and by reason of its meshing directly with the gear 330, will rotate said gear in the direction opposite to that previously set forth, or that indicated by the arrow in Fig.

5. Also, gear 329 will be driven in a reverse direction than heretofore, through the intervention of the gear 328.

The carriage 186 is caused to travel step-by-step toward the left, by mechanism which forms no part of this application and which it is not deemed necessary to describe. The movement of the carriage at each step is arrested with its indicating wheels directly in front of the banks of keys, so that it will be perfectly clear to the operator upon what indicating wheels will appear the number represented by the keys he has depressed. The relative arrangement of the gears of the indicating wheels, the gears below with which they mesh, and the train of transmission gearing to the rack 61, is such as will bring about this desired location of the indicating wheels with respect to the key banks.

Having thus described the various elements of the machine I will next describe its operation through one cycle of movements. Assume that the numeral wheels 227 have already been moved and that another number is to be added thereto which will necessitate a carrying of the tens. As heretofore described this number is placed in the key bank by depressing the corresponding numeral keys and then the "adding" key 135 is depressed. This allows the main clutch to engage and through the intermittent gears 36 and 32 to drive shaft 31, and through gear 30 and rack 29 to move the rack frame rearward, and those racks whose keys have been depressed.

Then during the pause at the end of this rearward movement shaft 159 is moved and cams 196 drop the frame 185 and hence the carriage 186. This allows the gears 229 of the numeral wheels to engage the corresponding wheels 157 and 160 on shafts 156 and 161 respectively.

Next the second half of gear 32 is thrown into operation and the rack frame is moved forwardly which moves those racks 60 which have been previously moved rearwardly. The movement of the rack bars through the racks 61 and pinions 150 is transmitted to the gears 157 and 160 as previously described, moving then in the direction of the solid arrows in Fig. 7. This movement takes place during the first half revolution of the main clutch. Also during this time any of the numeral wheels which have passed from nine through zero, will by means of the finger 232 have depressed the corresponding lever arm 294 and moved bell crank 285. The movement of the latter withdraws its end 286 from back of the shoulder 307 and permits the spring 284 to move the hub 281 to the left, which brings the points 282, carried thereby, into the plane of the star wheel 230 associated with the numeral wheel of the next higher order.

Now immediately after the rack bars 60 have come to rest in their forward position, cams 196 start rotating and raise the carriage, and at the same time shafts 156 and 161 through the train of gearing previously described are set in motion. Now as these shafts rotate in a counter-clockwise direction as viewed from the right hand end of the machine it will be apparent that one of the points 282 on the right hand carrier will first come into operation and then a point on the second carrier and so on to the left of the machine. The interval of time between the operation of the successive points is sufficient to allow one carrying operation to be completed before the next point comes into operation.

As soon as the carrying operation is complete the point 310 of that carrying unit will move the associated fork 306, the arms of which push the hub 281 to the right. This allows the end of bell crank lever 285 to drop back of the shoulder 307 on that hub so that when the next point 282 comes around it is not in the plane of the star wheel.

The permissive angle between the points of successive carrier is such that when a large number of numeral wheels are used, more than a half revolution of the shaft on which they are mounted, is required to effect the transfer. The points used for subtraction advance around the shaft in an opposite spiral and there is a certain position where the points coincide. To the left of this point the adding point and the subtracting point, continue advancing in the spiral relation but now the adding point and subtracting point (designated by 282 and 282′ respectively in Fig. 24), are on relatively opposite sides of their shafts.

From this it follows that unless means were provided to prevent such action the subtraction points on the left end of the carriage would carry as well as the regular adding point. To prevent this the collars 311 to the left of the single point carrier has two points, the first of which throws the carrier out of the plane of the corresponding star wheel, without dropping it behind the end of the bell crank as the subtraction points pass and the second point moves the carrier to its normal registering position in the plane of the star wheel.

The reason for moving shafts 295 vertically will now be apparent for the arms 294 which are normally positioned as in Fig. 15 are adapted to be moved by the star wheel when the latter is lowered as in Fig. 19. When the carriage is raised as shown in Fig. 15 the fingers 232 could not depress the arms 294 unless means were provided for causing the free end of the arms to move upwardly the same relative amount. It is necessary to have the arms 294 operative after the carriage is raised so that when any numeral wheel passes through zero due to a movement of the carrier of the next lower order, it will in turn transfer ten to the numeral wheel of next higher order.

To cause this movement of arm 294, cams 302 on shaft 159 are so timed that when cams 196 begin to raise the carriage 187 cams 302 start moving the plates 297 forwardly and thus lower shafts 295. The arms 295 move on pins 292 as a center and thus cause the outer end of the arms to follow the carriage upwardly until when the latter reaches its normal position, the ends of arms 294 are positioned as in Fig. 19. As heretofore explained the carrying operation starts after the carriage has been raised so that any numeral wheel which passes through zero due to a previous carrying operation will depress the arm 294 associated with the carrier of the next higher order and continue the carrying operation. The last movement of the cycle is when the arm 301 drops from the high point of cam 302 which allows plate 297 to move rearwardly, shafts 295 to raise, all parts then being in their normal position.

When subtraction is to be performed the various operations heretofore described are performed in the same order but the direction of rotation of wheels 157 and 160 together with shafts 156 and 161 is reversed. Thus the numeral wheels are rotated in the opposite direction and when they pass from zero to 9 or something less arm 294 is depressed and sets the carrying mechanism as previously described.

When the machine is at rest the carrier points 282 and 282′ are symmetrically disposed with respect to the star wheels above and hence when the shafts 157 and 160 rotate the subtraction points will in the same manner as described for addition move the star wheel of the higher order but in the reverse direction.

I claim—

1. In a machine of the character set forth, the combination of a pair of indicating wheels that are rotatable upon a common axis, one of said wheels having a star wheel and the other a finger, means for rotating said wheels independently of each other, a carrier movable transversely of the aforesaid star wheel into and out of the path thereof, means normally retaining the carrier out of the path of the star wheel, further means tending to move the carrier into the path of the star wheel, a member movable in opposition to the last mentioned means to restore the carrier to its normal position, a cam for operating said restoring member, the first mentioned means having a portion for coöperation with the aforesaid finger of one of the indicating wheels whereby said means is actuated upon a complete rotation of said indicating wheel thereby to release the carrier and allow it to move into the path of the star wheel of the other indicating wheel, and mechanism for rotating the carrier and the aforesaid cam.

2. In a machine of the character set forth, the combination of a pair of indicating wheels having one a star wheel and the other a finger that are rigid with their respective wheels, means for rotating each indicating wheel independent of the other, a carrier having a projection for coöperation with the aforesaid star wheel, a shaft whereon said carrier is slidably but non-rotatably mounted, said carrier being movable along the shaft into and out of the path of the star wheel, means tending to move the carrier into operative relation with the star wheel, further means for normally retaining the carrier out of the path of the star wheel, a restoring member for moving the carrier to normal position after it has been released by the last mentioned means, a cam for moving the restoring member as aforesaid, said second mentioned means having a portion for coöperation with the aforesaid finger of one of the indicating wheels whereby said means will be actuated to release the carrier when said portion is engaged by the finger, and mechanism for rotating the aforesaid shaft and cam.

3. In a machine of the character set forth the combination of a pair of indicating wheels that are rotatable upon a common axis, a finger rotatable with said wheel of lowest order, a star wheel rotatable with the other of said wheels, means for rotating said wheels independently of each other, a carrier adapted to coöperate with said star wheel and normally retained out of the path of said star wheel mechanism for rotating said carrier and means controlled by said finger for moving said carrier laterally into the path of said star wheel when said indicating wheel associated therewith has made a complete revolution.

4. In a machine of the character set forth, the combination of a series of indicating wheels each having a finger and a star wheel rotatable therewith, means for rotating said wheels independently of each other, carriers normally retained out of the paths of said star wheels, means for rotating said carrier, and means controlled by the finger of one indicating wheel for allowing the carrier associated therewith to move laterally into the path of the star wheel of next higher order.

5. In a machine of the character set forth, the combination of a plurality of indicating wheels each having a finger and a star wheel rotatable therewith, revolubly mounted carriers movable transversely of the said star wheel into and out of the path thereof, points on said carriers adapted to coöperate with said star wheels to move the same an amount corresponding to one digit, one point being operative for each direction of rotation of the carrier, means controlled by the said fingers for permitting the movement of said carriers laterally into the path of the star wheels of the next higher order upon a complete revolution of any indicating wheel, and means for rotating said carriers.

6. In a machine of the character set forth, the combination of a plurality of revoluble indicating wheels each having a star wheel and a finger rotatable therewith, rotatable carriers movable transversely of said star wheel and normally retained out of the path thereof, a pair of points one for each direction of rotation on said carriers for operating said star wheels, means controlled by the fingers of said indicating wheels for permitting the movement of said carriers into the path of the star wheels of the next higher order upon a complete revolution of said indicating wheels and means for restoring said carrier to normal after one of said points has been moved into the path of the coöperating star wheel.

7. In a machine of the character set forth, the combination of a plurality of indicating wheels each having a star wheel and a finger movable therewith, means for independently rotating said wheels in either direction, carriers having a pair of points one for each direction of rotation for coöperating with said star wheels, means normally retaining the points of said carriers out of the path of said star wheels, spring means tending to move the points of said carriers into the path of said star wheels, means for releasing said retaining means upon a complete rotation of the indicating wheel of next lower order and means for restoring said carriers to normal after one of said points has been moved into the path of the coöperating star wheel.

8. In a machine of the character set forth, the combination of a plurality of indicating wheels each having a star wheel and a finger movable therewith, means for independently rotating said wheels in either direction, rotatable carriers movable transversely of said star wheel and having a pair of points one for each direction of rotation for coöperating with said star wheels, means normally retaining the points of said carriers out of the path of said star wheels, spring means tending to move the points of said carriers into the path of said star wheels, means controlled by said fingers for releasing said retaining means upon a complete rotation of the indicating wheel of next lower order, means for moving said carriers after being released by said retaining means to allow one of said points to pass said star wheels and the second of said points to operate said star wheels, and means for restoring said carriers back of said retaining means after one of said points has acted upon said star wheel.

9. In a machine of the character set forth the combination of a plurality of indicating wheels each having a star wheel and a finger movable therewith, means for independently rotating said wheels, carriers for coöperating with said star wheels, means normally retaining said carriers out of the path of said star wheels, spring means tending to move said carriers into the path of said star wheels, means for releasing said retaining means upon a complete rotation of the indicating wheel of next lower order, means for restoring said carriers back of said retaining means, cams for moving said restoring means, and means for rotating said carriers and said cams.

10. In a machine of the character described, the combination of a plurality of pairs of rotatably mounted star wheels and fingers that are movable therewith, carriers movable transversely of the aforesaid star wheels into and out of the paths thereof, means normally retaining the carriers out of the paths of the star wheels, further means tending to move the carriers into the paths of the star wheels, members movable in opposition to the last mentioned means to restore the carriers to their normal positions, cams for operating said restoring members, the first mentioned means having portions for coöperation with the aforesaid fingers of said pairs whereby said means is actuated upon a complete rotation of said pairs, thereby to release the carriers and allow them to move into the paths of the star wheels of the pairs of next higher order, and mechanism for rotating the carriers and the aforesaid cams.

11. In a machine of the character set forth, the combination of a series of indicating wheels rotatable upon a common axis, and each having a star wheel and a finger rotatable therewith, means for rotating said indicating wheels independently of each other, carriers, each having an adding point and a subtracting point for coöperation with said star wheels, a shaft whereon said carriers are non-rotatably mounted, but movable axially into and out of the paths of said star wheels, said carrier points being arranged in spiral relation about said shaft and the spirals of said adding points and said subtracting points having an opposite direction of inclination, means tending to move the carriers into operative relation with the said star wheels, further means for normally retaining the carriers out of the paths of said star wheels and operable by said fingers to release said carriers, restoring members for moving the carriers to normal position after they have been released from said last mentioned means, cams for moving said restoring members and mechanism for rotating the said shaft and said cams.

12. In a machine of the character set forth, the combination of a series of star wheels and fingers arranged in connected pairs, means for independently rotating each of said pairs, carriers each having an adding point and a subtracting point for coöperation with said star wheels and arranged in spiral relation about their common axis, the spirals of said adding points and said subtracting points having opposite inclination, means tending to move said carriers into operative relation with said star wheels, further means for normally retaining the carriers out of the paths of said star wheels and operable by the finger of the next lower order to release said carriers, restoring members for moving said carriers in opposition to said first mentioned means after being released by said last mentioned means, cams each having a portion to cause said restoring members to move said carriers to normal position and some having a portion adapted to cause said restoring member to momentarily move said carriers out of coöperation with said star wheels before being restored by the aforesaid cam portion, and mechanism for rotating said carriers and said cams.

13. In a machine of the character set forth, the combination of a series of star wheels and fingers arranged in connected pairs on a common axis, means for independently rotating each of said pairs in either direction, a carrier for each of said pairs, a pair of points on said carriers for coöperation with said star wheels, one for each direction of rotation, said points being spaced at increasing angular distances apart from the carrier of lowest to that of highest order, means normally retaining said carrier points out of the path of said star wheels and operable by the finger of the star wheel of next lower order to move the carrier points into the path of the star wheels, restoring members for moving the carrier points out of the path of the star wheels and cams for operating said restoring members.

14. In a machine of the character set forth, the combination of a series of star wheels and fingers arranged in connected pairs on a common axis, means for independently rotating each of said pairs in either direction, a carrier for each of said pairs, a pair of points on said carriers for coöperation with said star wheels, one for each direction of rotation, said points being spaced at increasing angular distances apart from the carrier of lowest to that of highest order, means normally retaining said carrier points out of the path of said star wheels and operable by the finger of the star wheel of next lower order, to move the carrier points into the path of the star wheels, restoring members for moving the carrier points out of the path of the star wheels, cam means for causing said restoring means to move said carrier so that one of said points is rendered inoperative, additional cam means for causing said restoring member to move said carrier to its normal position and mechanism for rotating said cam means.

15. In a machine of the character set forth the combination of a pair of indicating wheels that are rotatable upon a common axis, a finger rotatable with said wheel of lowest order, a star wheel rotatable with the other of said wheels, means for rotating said wheels independently of each other, a carrier movable transversely of said star wheel into and out of the path thereof, spring means tending to move said carrier into the path of the aforesaid star wheel, a pivotally mounted lever having one end extending into the path of said carrier to normally retain the latter in opposition to said spring means, a pivotally mounted arm having its free end extending into the path of said finger and connected intermediate its ends to the said lever, whereby the aforesaid finger of one indicating wheel will cause the movement of said arm and said lever to release the said carrier, and mechanism for rotating said carrier.

16. In a machine of the character set forth the combination of a pair of indicating wheels that are rotatable upon a common axis, a finger rotatable with said wheel of lowest order, a star wheel rotatable with the other of said wheels, means for rotating said wheels independently of each other, a carrier movable transversely of said star wheel into and out of the path thereof, spring means tending to move said carrier into the path of the aforesaid star wheel, a pivotally mounted lever having one end extending into the path of said carrier to normally retain the latter in opposition to said spring means, a pivotally mounted arm having its free end extending into the path of said finger and connected intermediate its ends to the said lever, whereby the aforesaid finger of one indicating wheel will cause the movement of said arm and said lever to release the said carrier, a restoring member movable in opposition to said spring means, a cam for moving said restoring member, and mechanism for rotating said carrier and said cam.

17. In a machine of the character set forth, the combination of a plurality of indicating wheels each having a star wheel and a finger movable therewith, means for independently rotating said wheels in either direction, carriers, means for rotating said carriers in either direction, points on said carriers, one for each direction of rotation, said points being adapted to coöperate with said star wheels, spring means tending to move said carrier points into the paths of said star wheels, pivotally mounted levers having one end extending into the paths of said carriers to normally retain the same out of the paths of said star wheels, pivotally mounted arms having their free ends extending into the paths of said fingers, means connecting said arms with said lever whereby the movement of said arms by the finger of one order will cause said lever to release the carrier which coöperates with the star wheel of the next higher order.

18. In a mechanism of the character set forth, the combination of a plurality of indicating wheels rotatable upon a common axis and each having a star wheel and a finger movable therewith, operating means for independently rotating said wheels, means for moving said wheels into, and out of engagement with said operating means, a plurality of rotatable carriers each having a plurality of points for coöperation with the aforesaid star wheels, spring means tending to move said carrier points laterally into the paths of said star wheels, pivotally mounted bellcrank levers having one of their ends normally retaining said carriers in opposition to said spring means, a pivotally mounted arm for each of said indicating wheels, said arm having its free end extending into the path of said finger and connected intermediate its end, with the other end of said bellcrank lever, a restoring member for said carriers, and means for rotating said carriers.

19. In a machine of the character set forth, the combination of a pair of indicating wheels that are rotatable upon a common axis, a finger rotatable with said wheel of lowest order, a star wheel rotatable with the other of said wheels, operating means for rotating said wheels independently of each other, means for moving said wheels into and out of engagement with said operating means, a carrier having points for coöperation with the aforesaid star wheel, spring means tending to move said carrier points into the path of said star wheels, a pivotally mounted bellcrank lever having one end normally retaining said carrier in opposition to said spring means, a pivotally mounted arm having its free end extending into the path of said finger and connected intermediate its end with the other end of said bellcrank lever, and means for causing the free end of said arm to maintain a given position relative to the axes of said fingers when said indicating wheels are moved into, and out of engagement with said operating means.

In testimony whereof I affix my signature.

ADOLPHUS S. DENNIS.